United States Patent
Yanai et al.

(10) Patent No.: US 6,975,078 B2
(45) Date of Patent: Dec. 13, 2005

(54) DIMMING-CONTROL LIGHTING APPARATUS FOR INCANDESCENT ELECTRIC LAMP

(75) Inventors: Naoki Yanai, Tokyo (JP); Saburo Kimura, Tokyo (JP); Hiroshi Kita, Tokyo (JP); Hidemitsu Yamazuka, Tokyo (JP)

(73) Assignees: Nippon Hosos Kyokai, Tokyo (JP); Marumo Electric Co., Ltd., Tokyo (JP)

( * ) Notice: Subject to any disclaimer, the term of this patent is extended or adjusted under 35 U.S.C. 154(b) by 0 days.

(21) Appl. No.: 10/786,363

(22) Filed: Feb. 26, 2004

(65) Prior Publication Data

US 2004/0169477 A1 Sep. 2, 2004

(30) Foreign Application Priority Data

Feb. 28, 2003 (JP) ...................................... 2003-054298

(51) Int. Cl.$^7$ ................................................ G05F 1/00
(52) U.S. Cl. ........................ 315/291; 315/307; 323/905
(58) Field of Search .......................... 323/905; 315/291, 315/307

(56) References Cited

U.S. PATENT DOCUMENTS 5,038,081 A * 8/1991 Maiale et al. ............... 315/291

6,664,735 B2  12/2003 Kita et al.

FOREIGN PATENT DOCUMENTS

| JP | 492550 | 1/1974 |
|----|--------|--------|
| JP | 56165261 | 12/1981 |
| JP | 06151068 | 5/1994 |
| JP | 2001-143880 | 5/2001 |
| JP | 2002-093588 | 3/2003 |

* cited by examiner

Primary Examiner—Shawn Riley
(74) Attorney, Agent, or Firm—Dykema Gossett PLLC

(57) ABSTRACT

A dimming-control lighting apparatus for an incandescent electric lamp with less accompanying color temperature change, using a dimming power source installed in TV studios or theater stages, is disclosed. The voltage of the first filament whose rated voltage is lower than the maximum output voltage of a dimming power source rapidly rises to the sawtooth voltage of the dimming power source, and after the first filament reaches a constant color temperature, the output of the second filament having the same rated voltage as the maximum output voltage of the dimming power source is delayed to thereby light the second filament. Thyristors and connected to the first filament and the second filament, respectively, are operated by the control of control means based on the detection of the ignition phase angle of the sawtooth wave of the dimming power source to thereby light the first filament and the second filament (lamps), as mentioned above, so that dimming control having a smaller color temperature change is performed using the dimming power source.

7 Claims, 8 Drawing Sheets

DIMMING-CONTROL LIGHTING APPARATUS FOR INCANDESCENT ELECTRIC LAMP

BACKGROUND OF THE INVENTION

1. Field of the Invention

The present invention relates to a dimming-control lighting apparatus for an incandescent electric lamp used in directing spaces such as a TV studio, a theater stage, or a photo studio, which uses a lighting device employing the incandescent electric lamp as a light source.

2. Description of the Related Art

In the related art, it is indispensable to freely control the flux of light of the lighting device in the directing spaces such as the TV studio or theater stage; as such, incandescent electric lamps have been widely used as the light sources of the lighting devices.

However, when the dimming of an incandescent electric lamp is adjusted, color temperature, as well as the flux of light, occurring in the incandescent electric lamp is changed, which results in a degraded directing effect in lighting.

In particular, in a TV studio when using a TV camera or a photo studio when photographing in color, the change of color temperature due to an adjustment of dimming adversely affects image quality. In order to solve these problems in the related art, various measures have been adopted including correcting the color temperature by mounting color filters at the front face of the lighting device, or controlling the luminance of an illuminated plane by adjusting the angle of illumination of the lighting device rather than adjusting the dimming thereof.

In general, the flux of light of a tungsten halogen lamp is proportional to the power of 3.38 of a supply voltage, and color temperature is proportional to the power of 0.36 of the supply voltage. Thus, color temperature is proportional to the power of 0.107 of the flux of light.

For example, in case of using the tungsten halogen lamp having a color temperature of 3200K when the rated voltage is supplied thereto, the color temperature is decreased to 2970K when the flux of light is adjusted to 50%.

FIG. 12 is a graph of the specific flux of light versus the color temperature when the tungsten halogen lamp is dimmed using a conventional dimmer.

The visual brightness (hereinafter referred to as $LUX_0$) during stage lighting is regarded being proportional to the power of 2.0 to 3.0 of actual luminance (hereinafter referred to as LUX), and the control characteristic (called the dimming characteristic) of the dimmer is designed to conform to the proportional relationship.

For example, in a general case of using a dimming characteristic with the power of 2.3, when the dimming level becomes 50%, the LUX is about 20%, and the color temperature is proportional to the power of 0.245 of the $LUX_0$, which is decreased to 2700K.

FIG. 13 is a graph illustrating color temperature change with respect to the $LUX_0$ when the dimming characteristic has the power of 2.3.

As mentioned above, measures including using color filters or adjusting the light device or selecting the arrangement position of the same so as to avoid the decrease of color temperature have been adopted; however, these measures are complicated and troublesome, and cannot be regarded as complete methods for correcting the change of color temperature.

In order to solve the conventional problems, the applicant of the present invention has proposed a dimming-control lighting apparatus with less change of color temperature wherein a lighting device having a plurality of lamps or a lighting device having a lamp with two encapsulated filaments is used, and when the dimming is adjusted, one filament among the plurality of filaments first starts lighting and another one starts lighting when the color temperature of the one filament exceeds a predetermined value of a rated voltage. See Japanese Unexamined Patent Application Publication Nos. 2001-143880 and 2002-93588.

However, this lighting apparatus generally uses an AC power source, and requires control signal lines from the controller for controlling the dimmer.

On the other hand, most of the power sources for lighting apparatuses that have been installed in TV studios, photo studios, or theater stages are output power sources of the dimmer (hereinafter referred to as the dimming power source.) which are installed or constructed such that the dimming of the lighting apparatus can be freely controlled by the dimmer, and a connecting device, such as a connector, has been used so as to freely select and connect various lighting devices according to the purpose of its usage.

Thus, in order to use the above-mentioned dimming-control lighting apparatus for an incandescent electric lamp, new lines for a general AC power source and for control signals should be installed, which results in difficulty when employing incandescent in studios or theaters in which the lighting apparatus has already been installed.

SUMMARY OF THE INVENTION

The present invention has been achieved in view of the above problems. It is therefore an object of the present invention to provide a dimming-control apparatus for an incandescent electric lamp, using the dimming power source that has already been installed in various studios or theaters, which apparatus effects less change of color temperature.

In order to achieve the above object, one aspect of the present invention is to provide a dimming-control lighting apparatus for an incandescent electric lamp, the apparatus controlling the dimming to light a lighting device that uses the incandescent electric lamp as a light source by means of a dimming power source employing ignition phase angle control, comprising:

the lighting device including a first filament ($F_1$) in which the rated voltage is less than the maximum output voltage of the dimming power source, and a second filament ($F_2$), having the same rated voltage as the maximum output voltage of the dimming power source;

a first power control unit connected to the first filament ($F_1$);

a second power control unit connected to the second filament ($F_2$); and control means for controlling the first and second power control units connected to the first and second filaments, respectively, based on a sawtooth voltage that is supplied from the dimming power source and changed by adjusting the dimming, wherein the control means, while maintaining a dimming characteristic of the dimming power source, is arranged to control the first and second power control units so as to first light the first filament ($F_1$), to start lighting the second filament ($F_2$) after the color temperature of light emitted from the first filament ($F_1$) reaches a predetermined value, to compensate for degradation of the total color temperature due to the lighting start of the second filament by means of further increase of supply voltage for the first filament ($F_1$), and to increase the supply voltages for both the first and second filament ($F_1$ and $F_2$) in conformity with the dimming characteristic.

According to the above structure, dimming control can be performed while compensating for the degradation of color temperature based on the sawtooth voltage of the dimming power source changed by dimming adjustment using the dimming power source installed in various studios or theaters. Therefore, general AC power source or signal control lines are not necessary, and the dimming control for an incandescent electric lamp with a lower color temperature can be performed using the dimming power source that is already installed.

The lighting device is preferably one in which the first filament ($F_1$) has a less rated voltage than the maximum output voltage of the dimming power source, and the second element filament ($F_2$) has the same rated voltage as the maximum output voltage of the dimming power source, and for example, may be composed of one lamp with encapsulated first and second filaments ($F_1$ and $F_2$), or a first lamp with only the first filament ($F_1$) encapsulated and a second lamp with only the second filament ($F_2$) encapsulated.

The power ratio of the first filament ($F_1$) and the second filament ($F_2$) is preferably in a range of $F_1:F_2=0.2:0.8$ to $F_1:F_2=0.5:0.5$, practically, and most preferably in a range of $F_1: F_2=0.3:0.7$.

Further, the rated voltage of the first filament ($F_1$) is preferably 0.5 to 0.7 times that of the maximum value of the dimming power source. The maximum value of the dimming power source is practically and preferably the rated voltage of the second filament ($F_2$).

The power control unit may use switching elements for controlling power, such as a triode AC switch, a thyristor, a transistor, an IGBT, or a FET, arranged in both the first filament ($F_1$) and the second filament ($F_2$).

Preferably, the control means is digital means that includes a clock generator, a counter, a read-only memory (ROM), or the like, configured to detect the ignition phase angle of the sawtooth voltage changed by the dimming adjustment and supplied from the dimming power source by means of the clock signal from the clock generator, to read data from the ROM in which the dimming characteristic is written, based on the detection signal, and to digitally control each of the power control units.

Preferably, the control means is analog means arranged to supply the smoothing circuit with the sawtooth voltage that is supplied from the dimming power source and changed by the dimming adjustment, and to analog-control each of the power control units based on the output value from the smoothing circuit.

Preferably, in the dimming-control lighting apparatus according to the present invention, the respective power control units and the control means are built in the lighting device.

This lighting device has a simplified structure in which the dimming control unit consisting of the above-mentioned power control units, and the digital or analog control means, or the like are built in the control device, and can be properly employed in a TV studio, a theater stage, a photo studio, or the like, where the dimming power source is installed.

DESCRIPTION OF THE PREFERRED EMBODIMENT

Hereinafter, embodiments of the present invention will be described with reference to the accompanying drawings.

Figure 1:
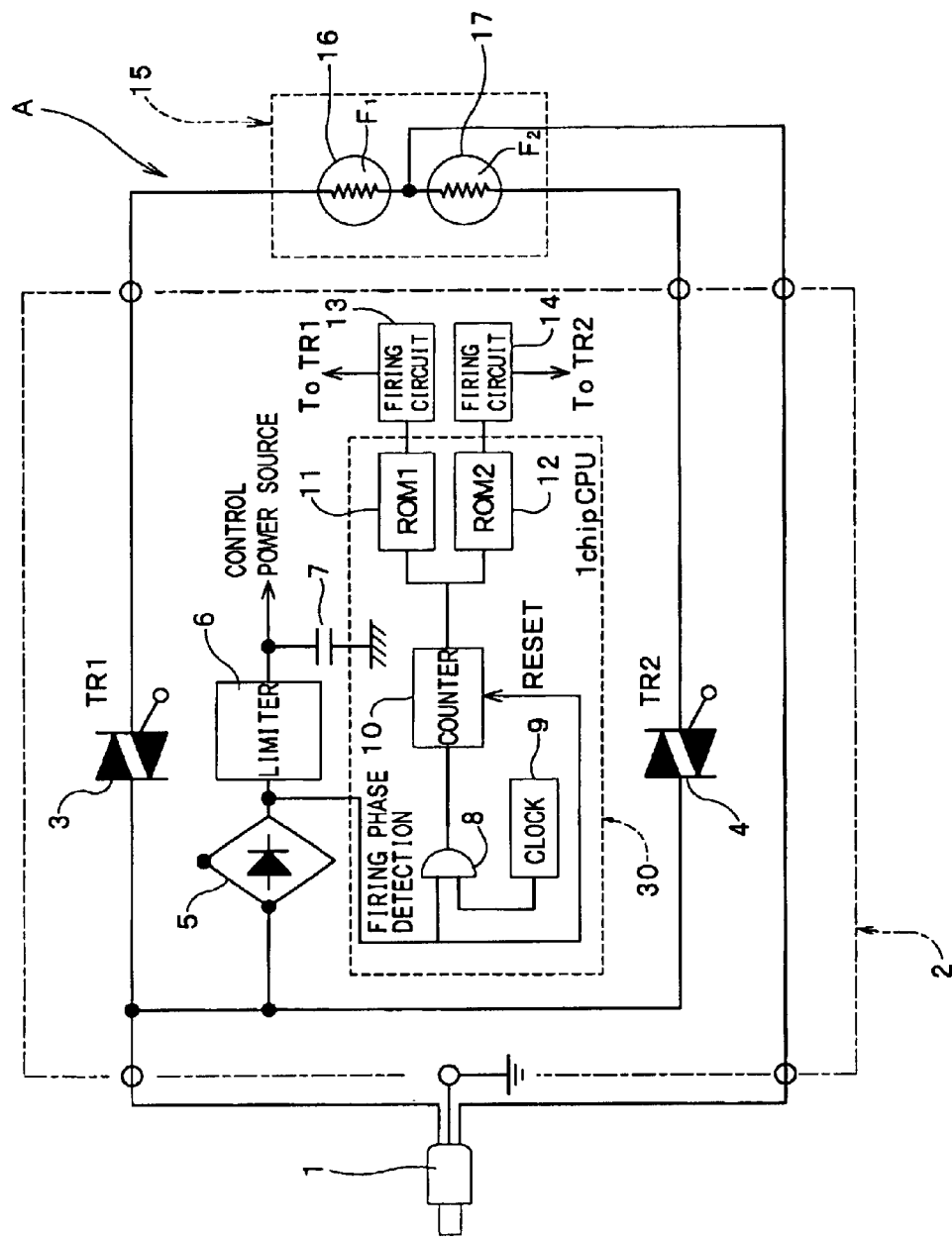
FIG. 1 is a circuit diagram illustrating one embodiment of the present invention.

FIG. 1 is a circuit diagram of a dimming-control lighting apparatus A for an incandescent electric lamp. Reference numeral 1 indicates a tripole connector having an earth line and a power source for connecting the present lighting apparatus to a dimming power source (not shown), reference numeral 15 indicates a lighting device, reference numeral 2 indicates a control box for dimming the lighting device 15 based on a sawtooth voltage supplied from the dimming power source to the present lighting apparatus A, and the lighting device 15 includes a first lamp 16 with a first encapsulated filament $F_1$ and a second lamp 17 with a second encapsulated filament $F_2$.

The control box 2 includes a thyristor ($TR_1$) 3 as a first power control unit connected to the first filament $F_1$, a thyristor (TR$_2$) 4 as a second power control unit connected to the second filament F$_2$, ignition circuits 13 and 14 for controlling the operation of the thyristors 3 and 4, control means 30 for controlling the operation of the ignition circuits 13 and 14, a full-wave rectifier for rectifying AC voltages from the dimming power source to be DC controlled voltages in a DC power source used for the present lighting apparatus, or the like.

Inputs of the thyristors 3 and 4 are connected to the dimming power source via the connecter 1. In addition, outputs of the thyristors 3 and 4 are connected to the first and second filaments F$_1$ and F$_2$, respectively, via sockets of the lamps 16 and 17 in the lighting device 15.

Reference numeral 6 indicates a limiter connected to the output of the full-wave rectifier 5, and which acts to have the DC control power source supplied from the full-wave rectifier 5 to be a stable control power source from the dimming power source, with its rms value always changing. That is, the control box 2 requires a normal control power source even when the rms value of the dimming power source is very low, and the limiter 6 is activated when the rms value of the dimming power source becomes high to thereby prevent an excessive control power source (i.e., a control voltage) from being transmitted. This limiter 6 includes thyristors, FETs, transistors, or the like.

Reference numeral 7 indicates a capacitor for smoothing voltage of the control power source.

Control means 30 in the control box 2 may be digital control means configured to digitally control each of the thyristors 3 and 4. Hereinafter, the control means 30 of the present embodiment will be described in detail.

Reference numeral 8 indicates a logic circuit element as an AND circuit, reference numeral 9 is a clock signal generator, reference numeral 10 indicates a counter, and one pole of the logic circuit element 8 is connected to the output of the full-wave rectifier 5 and the other pole is connected to the output of the clock signal generator 9, and the output of the logic circuit element 8 is connected to the input of the counter 10, whereby the counter 10 is activated to count the clock signal through the logic circuit element 8 while the instantaneous value of the sawtooth voltage of the dimming power source is higher than 0V, so that the ignition phase angle of the dimming power source is detected.

The output of the counter 10 is connected to both inputs of ROM$_1$ 11 and ROM$_2$ 12.

These ROM$_1$ 11 and ROM$_2$ 12 are read-only memories in which control characteristics for the thyristors 3 and 4 with respect to the ignition phase angle of the sawtooth voltage of the dimming power source are stored, and as such read by digital signals (that is, signals for detecting the ignition phase angle of the sawtooth voltage in the dimming power source) from the counter 10.

In addition, outputs of the ROM$_1$ 11 and ROM$_2$ 12 are connected to ignition (gate) terminals of the thyristors 3 and 4 through the ignition circuits 13 and 14, and while maintaining the dimming characteristic of the dimming power source, the operations of the ignition circuits 13 and 14 are controlled based on the read data to first light the first filament F$_1$, and then to light the second filament F$_2$ after the color temperature of light emitted from the first filament F$_1$ reaches a predetermined value. The degradation of the total color temperature resulting from the lighting of the second filament F$_2$ is then compensated by further increasing the supply voltage of the first filament F$_1$, and after the color temperature of the second filament F$_2$ reaches a predetermined value, supply voltages for both the first and second filaments F$_1$ and F$_2$ are increased to conform to the dimming characteristics to thereby independently control both thyristors 3 and 4.

In the dimming-control lighting apparatus A for an incandescent electric lamp of the present embodiment having the above-mentioned configuration, the operation thereof will be described with reference to FIGS. 2A to 2C, assuming that the dimming characteristic of the ignition circuit 13 and 14 has the power of 2.3, the rated color temperature of the lamps 16 and 17 is 3200K, the power ratio of the first filament F$_1$ is 0.3 (for example, 300 W) and the rated voltage ratio thereof is 0.7 (for example, 70V), and the power ratio of the second filament F$_2$ is 0.7 (for example 700 W) and the rated voltage ratio thereof is 1.0 (for example, 100V).

Figure 2:
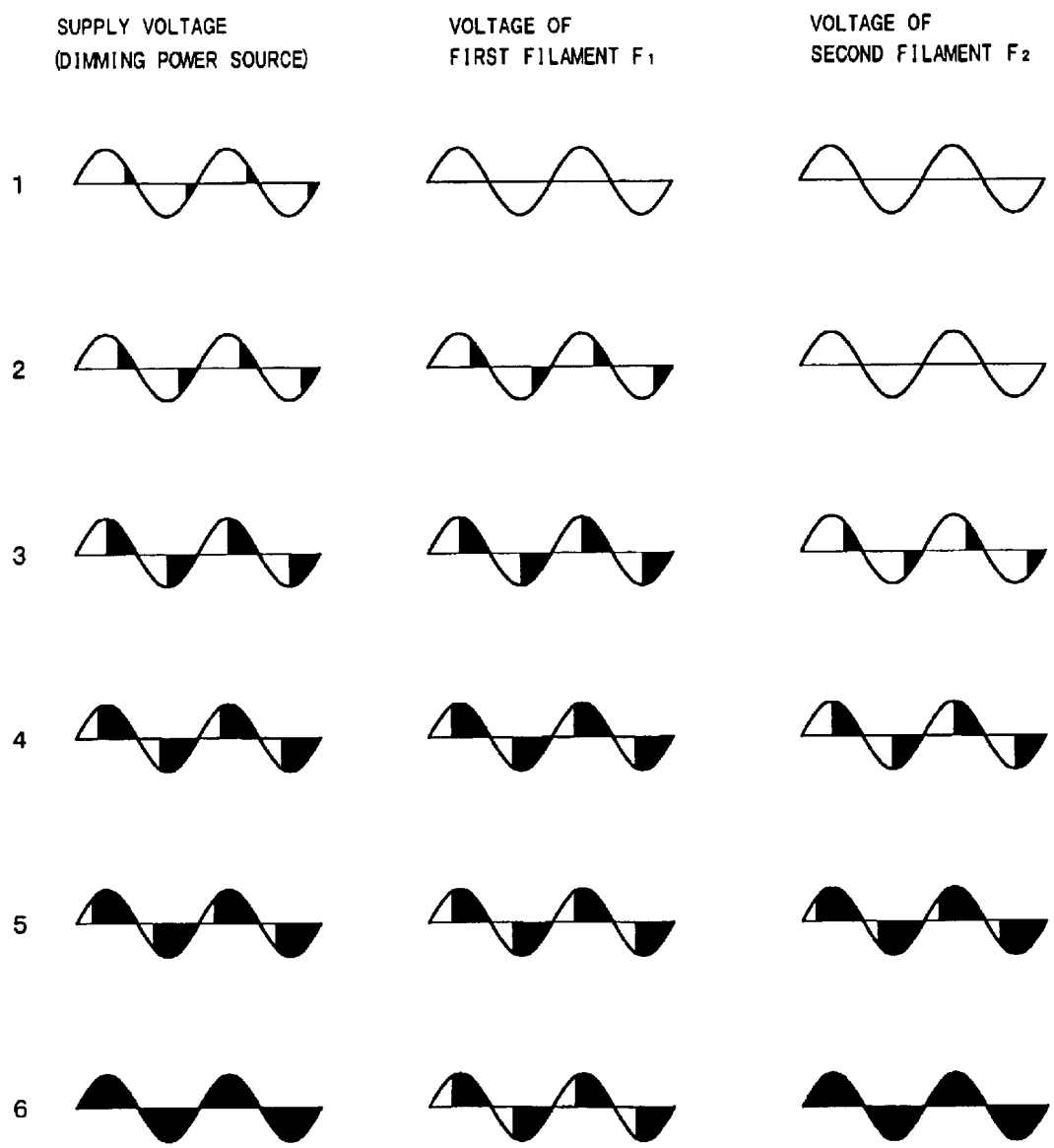
FIG. 2A shows a voltage waveform supplied from a dimming power source.
FIG. 2B shows a voltage waveform supplied to a first filament $F_1$.
FIG. 2C shows a voltage waveform supplied to a second filament $F_2$.

FIG. 2A shows a voltage waveform supplied from a dimming power source, FIG. 2B shows a voltage waveform supplied to a first filament F$_1$, FIG. 2C shows a voltage waveform supplied to a second filament F$_2$, and waveforms of each of FIGS. 2A, 2B, and 2C are represented as step 1 to step 6 vertically in time series.

In step 1, the sawtooth voltage of the dimming power source appears a little; however, the rms value thereof does not reach the value required for the control power source, so that thyristors 3 and 4 are not activated, and thus voltages are not supplied to both filaments F$_1$ and F$_2$.

In step 2, the ignition phase angle of the sawtooth voltage of the dimming power source is progressed to thereby supply the control box 2 with the control power source to be thereby activated, wherein the ignition phase angle of the first filament F$_1$ is first progressed to activate the thyristor 3 by controlling the ignition circuit 13 with the aid of data input read from the ROM$_1$, and the first filament F$_1$ is supplied with a voltage to start lighting the first lamp 16. The second lamp 17 is not lighted.

In step 3, the color temperature of the first filament F$_1$ reaches a predetermined value (for example, 3000K), the ignition phase angle of the second filament F$_2$ is progressed to activate the thyristor 4 by controlling the ignition circuit 14 with the aid of data input read from the ROM$_2$, and the second filament F$_2$ is supplied with a voltage to start lighting the second lamp 17.

In step 4, in order to compensate for the degradation of the total color temperature of the lighting device 15 having two filaments F$_1$ and F$_2$ due to lighting of the second filament F$_2$, the ignition phase angle of the first filament F$_1$ is further progressed to thereby maintain the total color temperature of the lighting device 15 at a constant value (for example, 3000K).

In step 5, when the color temperature of the second filament F$_2$ reaches a predetermined value (for example, 3000K) or when the supply voltage of the first filament F$_1$ reaches a rated value (for example, 70V), the ignition phase angle of the first filament F$_1$ stops increasing, and the ignition phase angle of the second filament F$_2$ further increases.

In step 6, the ignition phase angle of the dimming power source reaches a complete conductive state, and voltages for each of the filaments F$_1$ and F$_2$ reach rated voltages, respectively.

Figure 3:
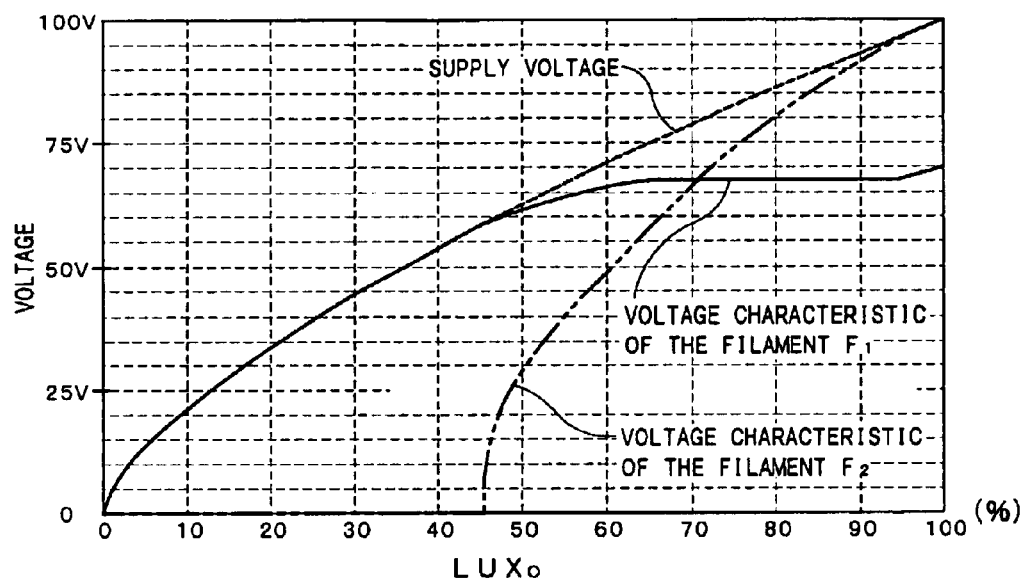
FIG. 3 is a graph illustrating root mean square (RMS) values of supply voltages and rms voltage value characteristics of $F_1$ and $F_2$ with respect to visual brightness ($LUX_0$) in the embodiment of FIG. 1.

FIG. 3 is a graph illustrating root mean square (RMS) values (dimming power sources) of the supply voltages and rms voltage value characteristics of F$_1$ and F$_2$ with respect to visual brightness (LUX$_0$) in the embodiment of FIG. 1, wherein the voltage supplied to the first filament F$_1$ is approximately the same as that of the dimming power source, which is in a range of 0% to 45% of LUX$_0$.

When the $LUX_0$ exceeds 45%, the supply voltage of the filament $F_2$ starts to increase, and accordingly, the supply voltage of the filament $F_1$ continues to increase at a slow curve so as to maintain the color temperature.

When the $LUX_0$ reaches 65%, the color temperature of the filament $F_2$ reaches a predetermined value (for example, 3000K), the supply voltage of the filament $F_1$ stops increasing; however, the supply voltage of the filament $F_2$ continues increasing, and reaches a rated voltage when the $LUX_0$ reaches 100%.

Figure 4:
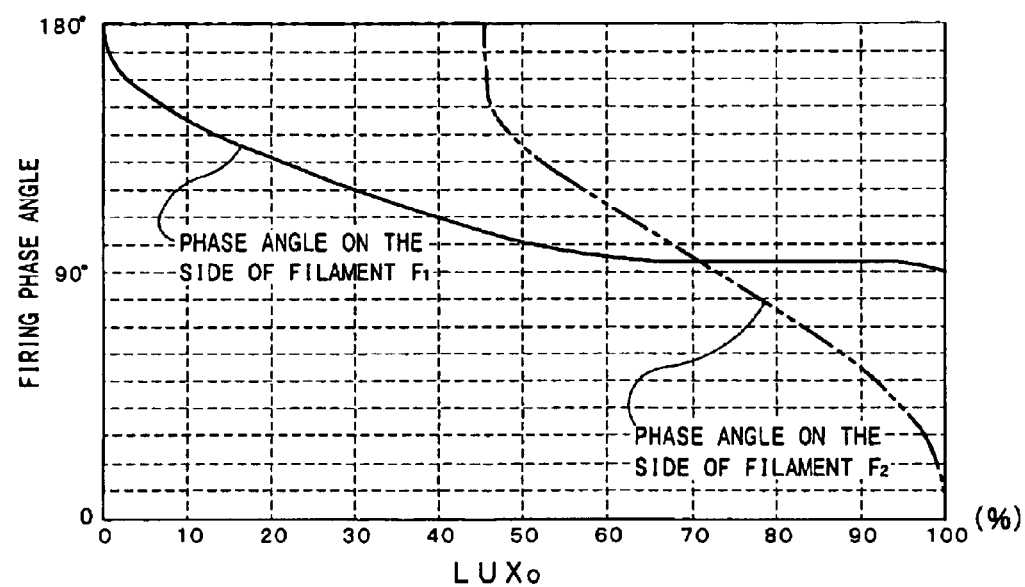
FIG. 4 is a graph illustrating characteristics of ignition phase angles of the filaments $F_1$ and $F_2$ with respect to visual brightness ($LUX_0$) in the embodiment of FIG. 1.

FIG. 4 is a graph illustrating characteristics of ignition phase angles of the thyristor 3 (on the side of the filament $F_1$) and the thyristor 4 (on the side of the filament $F_2$) with respect to visual brightness ($LUX_0$) to obtain the above-mentioned output voltage characteristics, wherein the ignition phase angle of the thyristor 3 progresses from 0% of $LUX_0$ and becomes a constant value at 65%, so that the final ignition phase angle is 90°.

On the other hand, the ignition phase angle of the thyristor 4 is not fired at 180° until the $LUX_0$ reaches 45%; however, when the $LUX_0$ exceeds 45%, the ignition phase angle progresses to thereby reach 0° at 100% of $LUX_0$.

Figure 5:
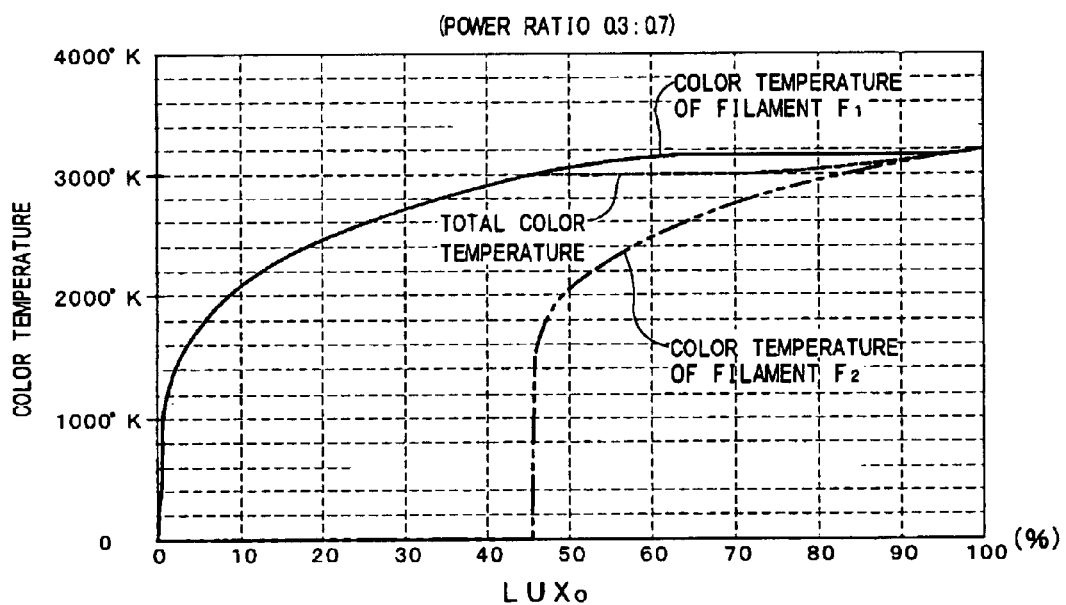
FIG. 5 is a graph illustrating the color temperature of each of the filaments $F_1$ and $F_2$ and the total color temperature of the whole lighting apparatus with respect to visual brightness ($LUX_0$) in the embodiment of FIG. 1.

FIG. 5 is a graph illustrating the color temperature of each of the filaments $F_1$ and $F_2$ and the total color temperature of the whole lighting apparatus with respect to visual brightness ($LUX_0$).

Figure 13:
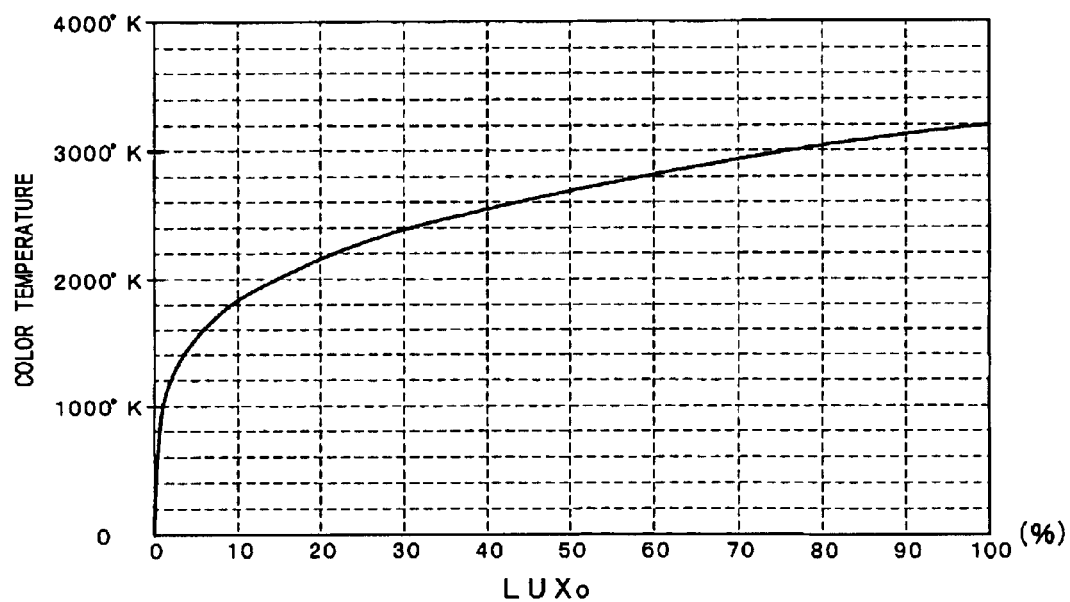
FIG. 13 is a graph illustrating the change of color temperature with respect to visual brightness ($LUX_0$) when the dimming characteristic has the power of 2.3.

Comparing the graph of the color temperature change of the present embodiment, as shown in FIG. 5, with that of the related art, as shown in FIG. 13, both the color temperatures of the related art and the present invention are 2200K and 2450K at 20% of $LUX_0$, and 2550K and 2900K at 40% of $LUX_0$, respectively, and, when the $LUX_0$ exceeds 45%, color temperature is maintained at 3000K or more in the present invention, whereas, in the related art, the color temperature does not reach the 3000K if the $LUX_0$ does not reach 77% or more.

It can be seen from the above-mentioned results that the dimming-control lighting apparatus A for the incandescent electric lamp according to the present embodiment has a significant effect on color temperature change, and, at the same time, the lighting apparatus A can control the dimming of the incandescent electric lamp with less of a change in color temperature using the dimming power source equipped with a TV studio, or the like.

However, in the present embodiment, the characteristics of the first and setting second filaments $F_1$ and $F_2$ are shown by setting the power ratio thereof to $F_1: F_2=0.3:0.7$, but the power ratio is not limited thereto and the present invention can be implemented even if the power ratio is modified to other combinations.

Figure 6:
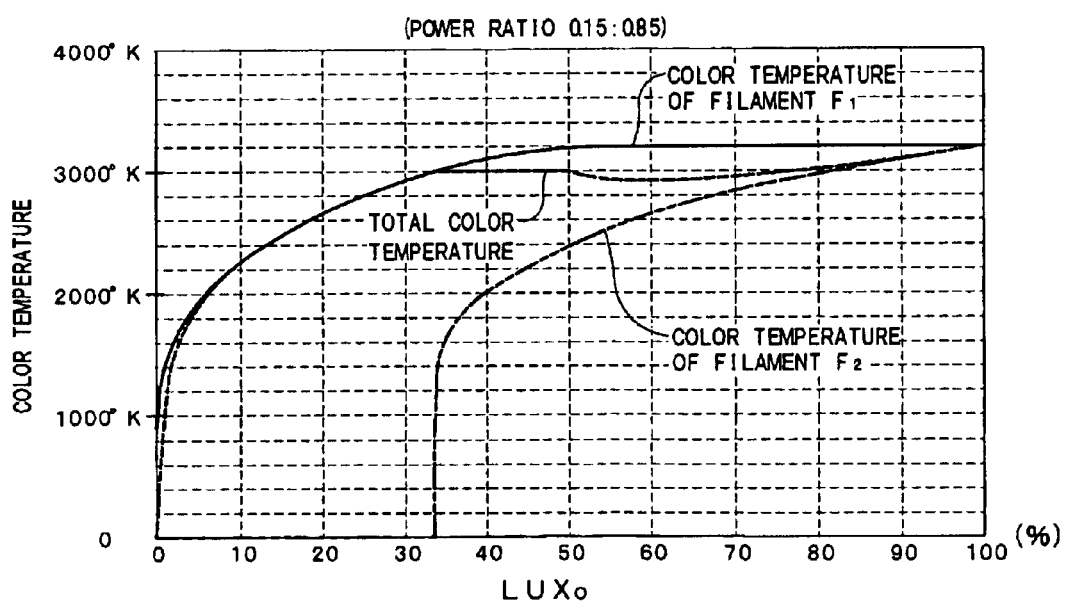
FIG. 6 is a graph illustrating the color temperature of each of the filaments $F_1$ and $F_2$ and the total color temperature of the whole lighting apparatus with respect to visual brightness ($LUX_0$) when the power ratio of the filaments $F_1$ and $F_2$ is 0.15:0.85 in the embodiment of FIG. 1.

FIG. 6 shows a characteristic of color temperature with respect to $LUX_0$, wherein the power ratio of the filaments $F_1$ and $F_2$ is 0.15:0.85, and the rated voltage ratio of the first filament $F_1$ is 0.4 times (for example, 40V) the maximum of the dimming power source, and the other conditions are the same as the previous conditions related to FIGS. 2A to 2C.

According to the above configuration, the characteristic of color temperature is more enhanced compared to the above-mentioned case of $F_1: F_2=0.3:0.7$, and the color temperature can be maintained at about 3000K when the $LUX_0$ is 34% or more, however there exists a small amount of degradation of the total color temperature at about 60% of $LUX_0$.

Figure 7:
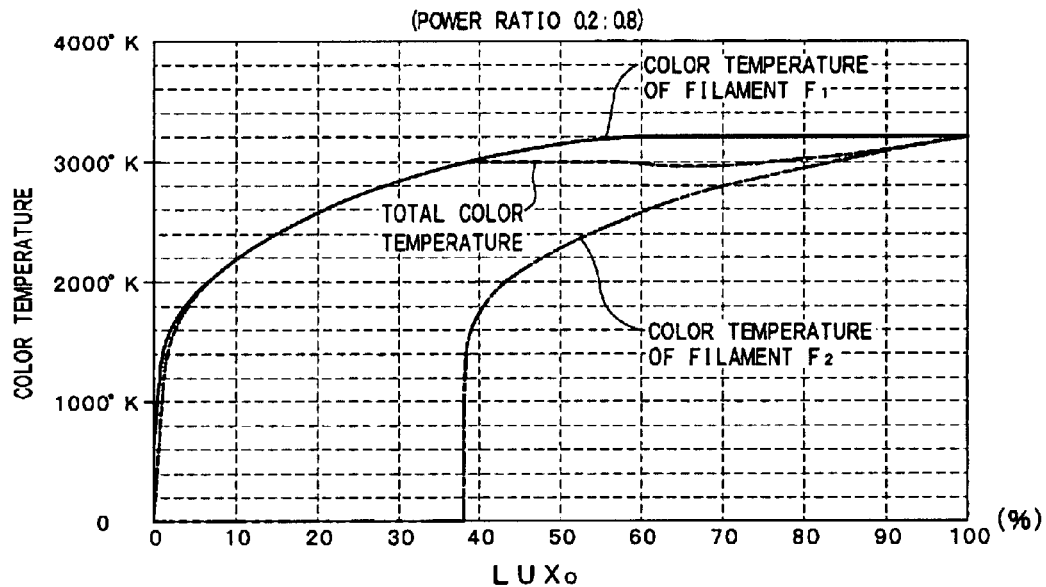
FIG. 7 is a graph illustrating the color temperature of each of the filaments $F_1$ and $F_2$ and the total color temperature of the whole lighting apparatus with respect to visual brightness ($LUX_0$) when the power ratio of the filaments $F_1$ and $F_2$ is 0.2:0.8 in the embodiment of FIG. 1.

FIG. 7 shows a characteristic of color temperature with respect to the $LUX_0$, wherein the power ratio of the filaments $F_1$ and $F_2$ is 0.2:0.8, and the rated voltage ratio of the first filament $F_1$ is 0.5 times (for example, 50V) the maximum of the dimming power source, and the other conditions are the same as the previous conditions related to FIGS. 2A to 2C.

According to the above configuration, the characteristic of color temperature is more enhanced compared to the above-mentioned case, and the total color temperature can be maintained at 3000K when the $LUX_0$ is 38% or more; however there exists a small amount of the total color temperature at about 60% to about 70% of $LUX_0$.

Figure 8:
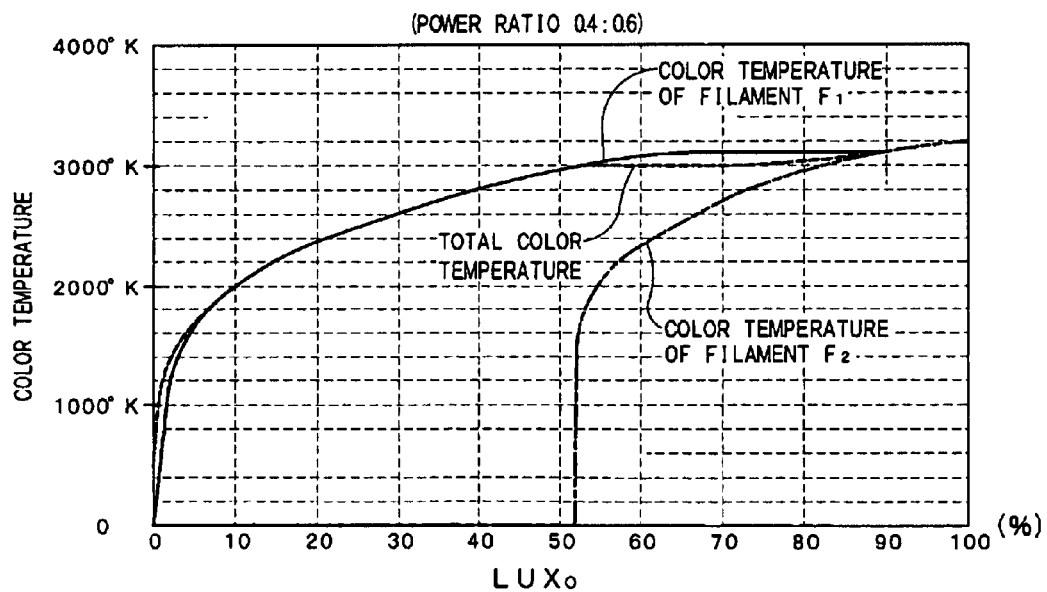
FIG. 8 is a graph illustrating the color temperature of each of the filaments $F_1$ and $F_2$ and the total color temperature of the whole lighting apparatus with respect to visual brightness ($LUX_0$) when the power ratio of the filaments $F_1$ and $F_2$ is 0.4:0.6 in the embodiment of FIG. 1.
Figure 9:
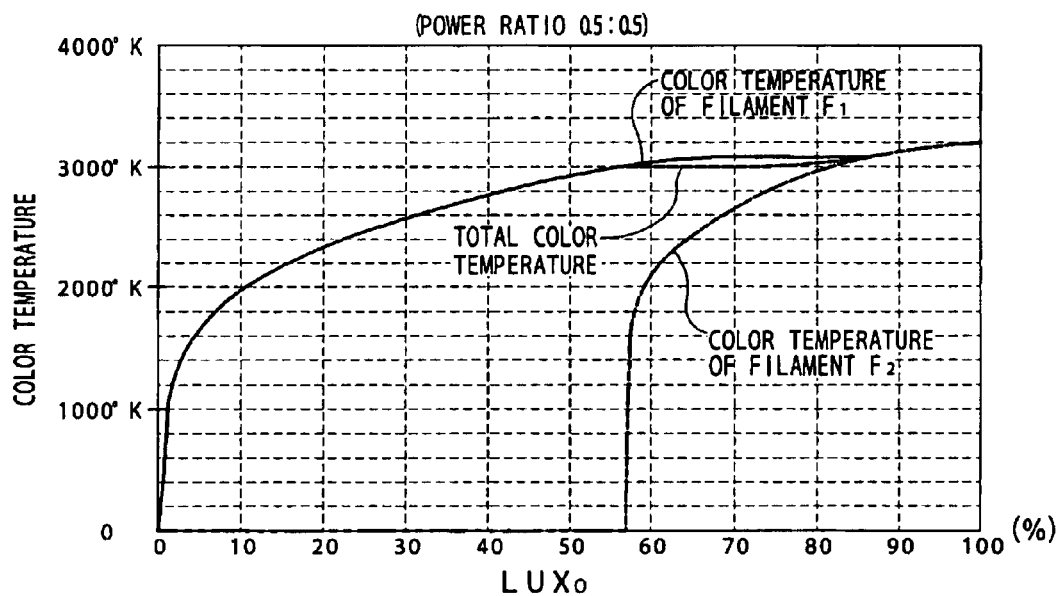
FIG. 9 is a graph illustrating the color temperature of each of the filaments $F_1$ and $F_2$ and the total color temperature of the whole lighting apparatus with respect to visual brightness ($LUX_0$) when the power ratio of the filaments $F_1$ and $F_2$ is 0.5:0.5 in the embodiment of FIG. 1.

FIGS. 8 and 9 show characteristics of color temperature with respect to $LUX_0$, wherein the power ratio of the filaments $F_1$ and $F_2$ is 0.4:0.6 in FIG. 8, the power ratio of the filaments $F_1$ and $F_2$ is 0.5:0.9 in FIG. 9, the rated voltage ratio of the first filament $F_1$ is 0.7times (for example, 70V) the maximum of the dimming power source, and the other conditions are the same as the previous conditions related to FIGS. 2A to 2C.

In any cases, the value of $LUX_0$ capable of maintaining color temperature at 3000K or more becomes 52% and 57% in FIG. 8 and FIG. 9, respectively so that the characteristic of color temperature is degraded compared to the above-mentioned case; however, color temperature is significantly improved compared to the characteristic of color temperature by means of the conventional dimmer, as shown in FIG. 13.

Figure 10:
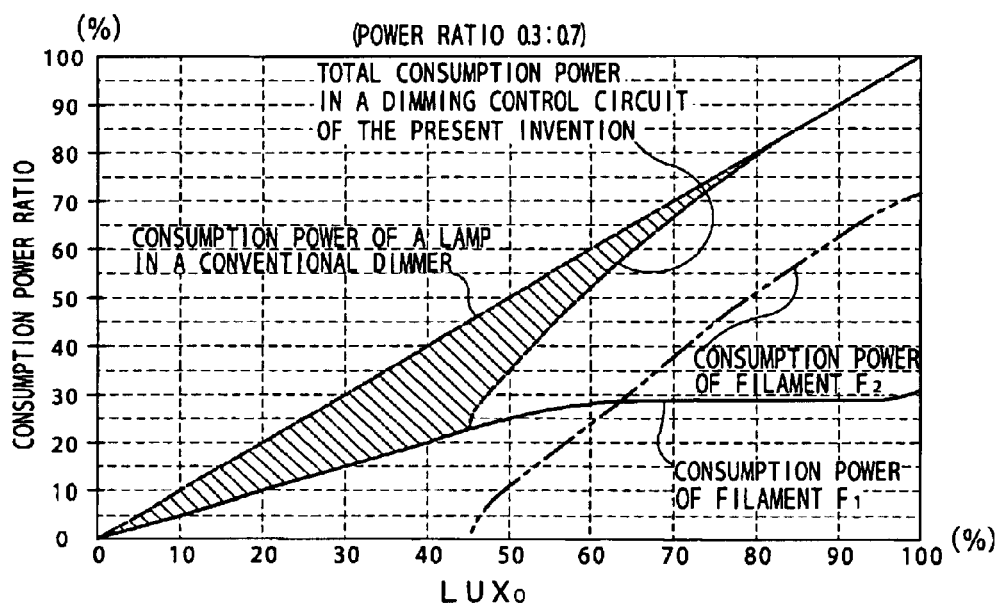
FIG. 10 is a graph illustrating comparison of the consumption power during dimming by the conventional dimmer with the consumption power during dimming by the dimming-control lighting apparatus of the present invention.

FIG. 10 is a graph illustrating the comparison of the consumption power during dimming by the dimming-control lighting apparatus of the present invention with the consumption power during dimming by the conventional dimmer. A controller for controlling dimming of the lighting apparatus according to the present invention has a circuit configuration, as shown in FIG. 1 wherein the dimming characteristics of the ignition circuits 13 and 14, rated color temperature of the lamp 16 and 17, and the power ratio and rated voltage values of the first and second filaments $F_1$ and $F_2$ are the same as the previous conditions related to FIGS. 2A to 2C.

The lamp efficiency (which is generally represented as 1 m/W) is proportional to the power of 1.84 of the supply voltage. In the present invention, after the supply voltage of the first filament $F_1$ rises rapidly, that of the second filament $F_2$ also rises rapidly, so that the period of low lamp efficiency is short, and overall lamp efficiency improved compared to the case of dimming the conventional lamp, thereby creating significant energy savings.

In other words, as shown in FIG. 10, in a range of 20% to 60% of $LUX_0$, it can be seen that the lighting apparatus of the present invention can obtain a consumption power energy saving of 10% or more compared to the conventional dimmer, and a consumption power energy saving of 20% can be obtained at about 45% of $LUX_0$.

In the above embodiment, as shown in FIG. 1, the control means 30 detects the ignition phase angle of the dimming power source from the counter 10, and reads a control characteristic from the ROM 11 and 12 in which the control characteristic is written, based on the digital signal of the counter 10, and controls the thyristors 3 and 4 in digitally controlled manner; however, this control means 30 can be applied to analog means, which will be described as another embodiment with reference to FIG. 11.

Figure 11:
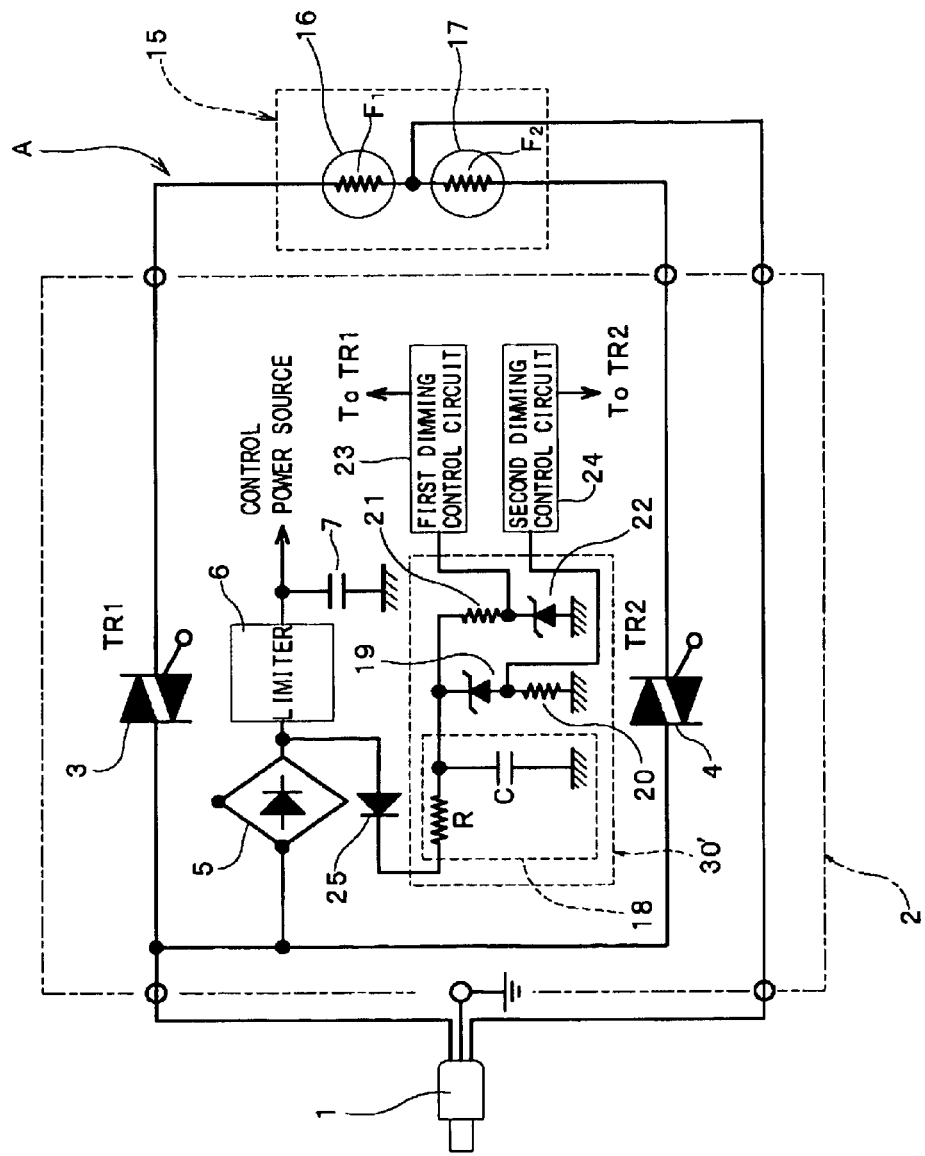
FIG. 11 is a circuit diagram illustrating another embodiment of the present invention.
Figure 12:
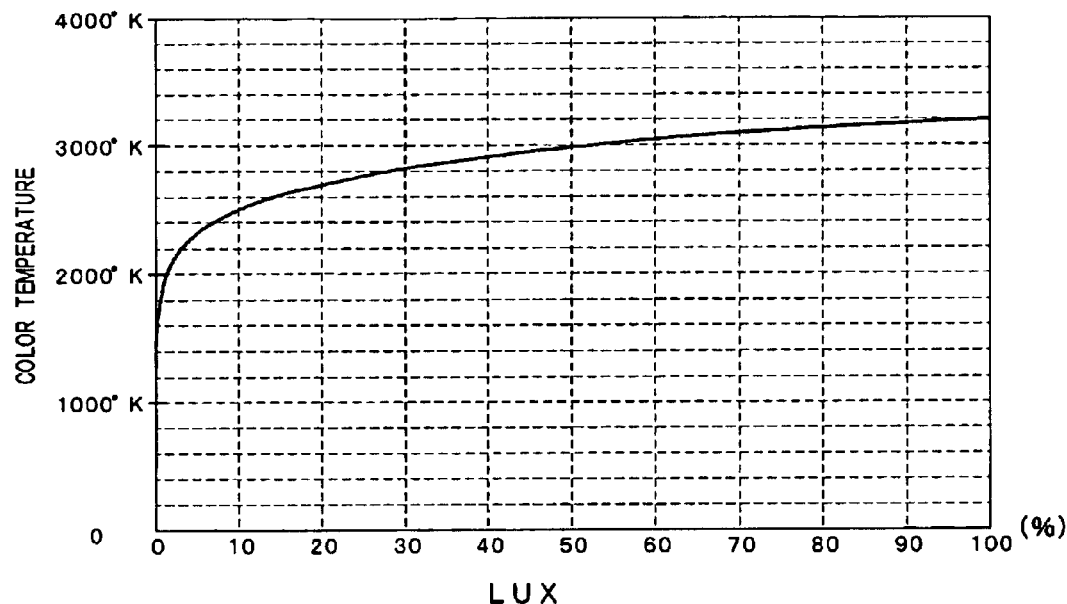
FIG. 12 is a graph illustrating the color temperature with respect to the specific flux of light (LUX) when a tungsten halogen lamp is dimmed by the conventional dimmer.

In the embodiment shown in FIG. 11, elements having the same function as the circuit configuration in FIG. 1 are given the same reference numerals and repeated description thereof will be omitted.

The control means 30' in this embodiment includes a smoothing circuit 18 for smoothing the sawtooth voltage that has been full wave rectified by the full-wave rectifier 5 to be an output value that is approximately proportional to the $LUX_0$ when the incandescent electric lamp is lighted by the dimming power source, a voltage-limiting circuit consisting of a constant voltage diode 22 and a resistor 21 for supplying a first dimming control unit 23 with the output voltage of the smoothing circuit 18 as a control signal voltage, and a voltage-limiting circuit consisting of a constant voltage diode 19 and a resistor 20 for supplying a second dimming control unit 24 with the output voltage of the smoothing circuit 18 as a control signal voltage.

Reference numeral 25 indicates a reverse current preventing diode, and the sawtooth voltage that is full wave rectified by the full-wave rectifier 5 is supplied to the smoothing circuit 18 through the reverse current preventing diode 25.

The smoothing circuit 18 includes a resistor R and a capacitor C, and is configured to obtain an output voltage that is approximately proportional to the $LUX_0$ when the incandescent electric lamp is lighted by the dimming power source by setting values of the resistor and the capacitor arbitrarily.

The voltage-limiting circuit consisting of the resistor 21 and the constant voltage diode 22, supplies the output voltage from the smoothing circuit 18 to the first dimming control unit 23 as a control signal voltage until the output value from the smoothing circuit becomes a constant value, and limits the output voltage to be the zener voltage of the constant voltage diode 22 when the output voltage from the smoothing circuit 18 exceeds the constant value.

The voltage-limiting circuit consisting of the resistor 20 and the constant voltage diode 19, have an output voltage of 0V, and thus does not supply the output voltage from the smoothing circuit 18 to the second dimming control unit 24 until the output voltage from the smoothing circuit reaches the zener voltage of the constant voltage diode 19, and supplies the output voltage to the dimming control unit 24 as the zener voltage of the constant voltage diode 19 when the output voltage exceeds the zener voltage of the constant voltage diode 19.

The first and second dimming control units 23 and 24 are used in a general dimmer, which output ignition phase angles of thyristors with respect to the analog signal (control signal voltage) input from each of the voltage-limiting circuits, and each output of the devices is connected to a ignition (gate) terminal of thyristors 3 and 4, respectively, to thereby timely control the operation of the thyristors 3 and 4.

According to the control means 30' having the above-mentioned structure, the sawtooth voltage of the dimming power source is smoothed by the smoothing circuit 18, and the voltage that is approximately proportional to the $LUX_0$ is simultaneously obtained when the incandescent electric lamp is lighted by the dimming power source, so that the output voltage of the smoothing circuit 18 is supplied to the first dimming control unit 23 as a control signal voltage, until the output of the smoothing circuit 18 reaches a constant value, to thereby activate the dimming control unit 23 and control the thyristor 3, and the first filament $F_1$ (lamp 16) then starts lighting. When the output of the smoothing circuit 18 reaches a constant value, the constant voltage diode 22 is activated to limit its output, so that the ignition phase angle and the output voltage of the thyristor 3 maintain constant values, which leads to obtaining the voltage characteristic of the first filament $F_1$ shown in FIG. 3 and the ignition phase angle characteristic of the first filament $F_1$ shown in FIG. 4.

The output of the smoothing circuit 18 has a control signal voltage of 0V with respect to the dimming control unit 24 until the output of the smoothing circuit reaches the zener voltage of the constant voltage diode 19, so that the dimming control unit 24 is not activated and therefore the thyristor 4 does not fire and the second filament $F_2$ (lamp 17) is not lighted.

When the output of the smoothing circuit 18 exceeds the zener voltage of the constant voltage diode 19, the control signal voltage is applied to the dimming control unit 24, so that the thyristor 4 starts ignition and the second filament $F_2$ (lamp 17) starts lighting.

In this way, the voltage characteristic of the second filament $F_2$ shown in FIG. 3 and the ignition phase angle characteristic of the second filament $F_2$ shown in FIG. 4 can be obtained.

Therefore, the dimming-control light apparatus A for an incandescent electric lamp having the aforementioned analog control means 30' operates in the same way as does the apparatus having the above-mentioned digital control means 30. As a result, it is possible to obtain the effects of an improved color temperature characteristic and reduced consumption power when adjusting dimming.

The embodiments of the dimming-control lighting apparatus for an incandescent electric lamp according to the present invention has been described hitherto with reference to the drawings; however, the present invention is not limited to the illustrated embodiments, and, various modifications can be made within the criteria of the technical spirit set forth in the claims, and for example, the control box 2 can be built in the lighting device 15.

Since the dimming-control lighting apparatus for an incandescent electric lamp according to the present invention is configured as described above, a lighting apparatus equipped with an incandescent lamp used in directing spaces such as a TV studio, a theater stage, or a photo studio has an extremely small color temperature change and can control the dimming with less flickering while using a dimming power source installed in the directing spaces.

Furthermore, since a light device having two filaments encapsulated in the same lamp or a plurality of lamps is employed to select the rated power or rated voltage for the respective filaments or lamps, many effects can be obtained including a state characteristic for any color temperature as well as improved color temperature degradation or reduced consumption power in the range of low luminance.

In addition, according to the lighting apparatus of the present invention, the above-mentioned power control units and control means, and the like is built in the lighting device, whereby they can be properly utilized in a TV studio, a theater stage, a photo studio, or the like equipped with the dimming power source.

Having described specific preferred embodiments of the invention with reference to the accompanying drawings, it will be appreciated that the present invention is not limited to those precise embodiments, and that various changes and modifications can be effected therein by one of ordinary skill in the art without departing from the scope of the invention as defined by the appended claims.

What is claimed is:

1. A dimming-control lighting apparatus for an incandescent electric lamp, the apparatus controlling the dimming to light a lighting device that uses the incandescent electric lamp as a light source by means of a dimming power source employing ignition phase angle control, comprising:

the lighting device including a first filament in which the rated voltage is less than the maximum output voltage of the dimming power source, and a second filament, having the same rated voltage as the maximum output voltage of the dimming power source;

a first power control unit connected to the first filament;

a second power control unit connected to the second filament; and control means for controlling the first and second power control units connected to the first and second filaments, respectively, based on a sawtooth voltage that is supplied from the dimming power source and changed by adjusting the dimming, wherein the control means, while maintaining a dimming characteristic of the dimming power source, is arranged to control the first and second power control units so as to first light the first filament, to start lighting the second filament after the color temperature of light emitted from the first filament reaches a predetermined value, to compensate for degradation of the total color temperature due to the lighting start of the second filament by means of further increase of supply voltage for the first filament, and to increase the supply voltages for both the first and second filament in conformity with the dimming characteristic.

2. The dimming-control lighting apparatus for an incandescent electric lamp according to claim 1, wherein the power ratio of the first filament and the second filament is in a range of the first filament:the second filament=0.2:0.8 to the first filament:the second filament=0.5:0.5, and the rated voltage value of the first filament is in a range of 0.5 to 0.7 times the maximum value of the dimming power source.

3. The dimming-control lighting apparatus for an incandescent electric lamp according to claim 1, wherein the control means is digital means that includes a clock generator, a counter, a read-only memory (ROM), or the like, configured to detect the ignition phase angle of the sawtooth voltage changed by the dimming adjustment and supplied from the dimming power source by means of the clock signal from the clock generator, to read data from the ROM in which the dimming characteristic is written, based on the detection signal, and to digitally control each of the power control units.

4. The dimming-control lighting apparatus for an incandescent electric lamp according to claim 2, wherein the control means is digital means that includes a clock generator, a counter, a read-only memory (ROM), or the like, configured to detect the ignition phase angle of the sawtooth voltage changed by the dimming adjustment and supplied from the dimming power source by means of the clock signal from the clock generator, to read data from the ROM in which the dimming characteristic is written, based on the detection signal, and to digitally control each of the power control units.

5. The dimming-control lighting apparatus for an incandescent electric lamp according to in claim 1, wherein the control means is analog means arranged to supply the smoothing circuit with the sawtooth voltage that is supplied from the dimming power source and changed by the dimming adjustment, and to analog-control each of the power control units based on the output value from the smoothing circuit.

6. The dimming-control lighting apparatus for an incandescent electric lamp according to in claim 2, wherein the control means is analog means arranged to supply the smoothing circuit with the sawtooth voltage that is supplied from the dimming power source and changed by the dimming adjustment, and to analog-control each of the power control units based on the output value from the smoothing circuit.

7. The dimming-control lighting apparatus for an incandescent electric lamp according to claim 1, wherein the respective power control units and the control means are built in the lighting device.

* * * * *

UNITED STATES PATENT AND TRADEMARK OFFICE
CERTIFICATE OF CORRECTION

PATENT NO. : 6,975,078 B2 Page 1 of 1
APPLICATION NO. : 10/786363
DATED : December 13, 2005
INVENTOR(S) : Yanai et al.

It is certified that error appears in the above-identified patent and that said Letters Patent is hereby corrected as shown below:

Title page,
Item [73], Assignee, should read:
-- Nippon Hoso Kyokai, Tokyo (JP);
  Marumo Electric Co., Ltd., Tokyo
  (JP) --.

Signed and Sealed this

Twenty-seventh Day of June, 2006

JON W. DUDAS
*Director of the United States Patent and Trademark Office*